Figure 1:
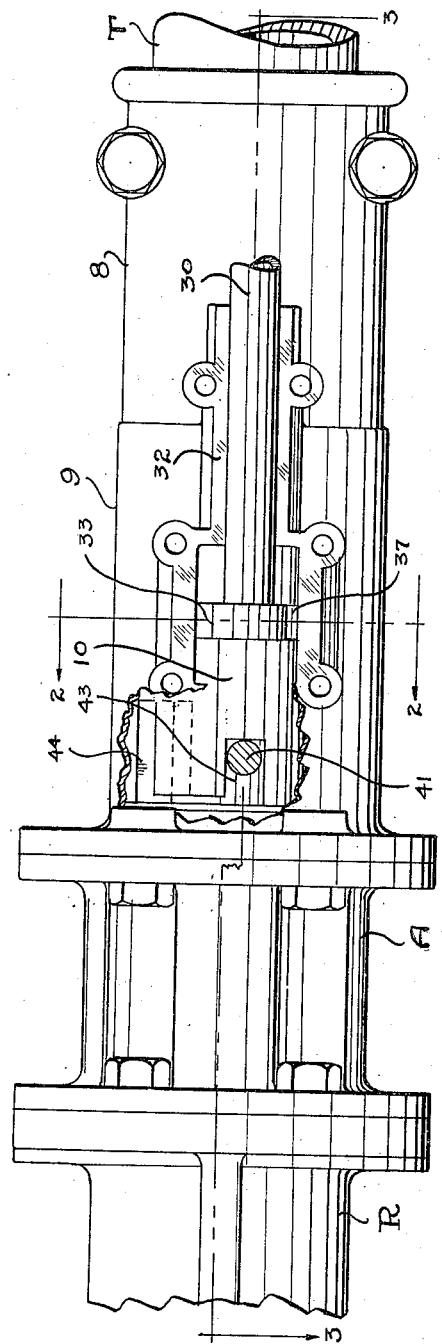

Oct. 29, 1929.  C. E. F. AHLM  1,733,769
TRANSMISSION GEARING
Filed Dec. 18, 1924   4 Sheets-Sheet 2

Inventor
Charles E. F. Ahlm,
By Botts, Macklin, Goldrick & Teare
Attorneys

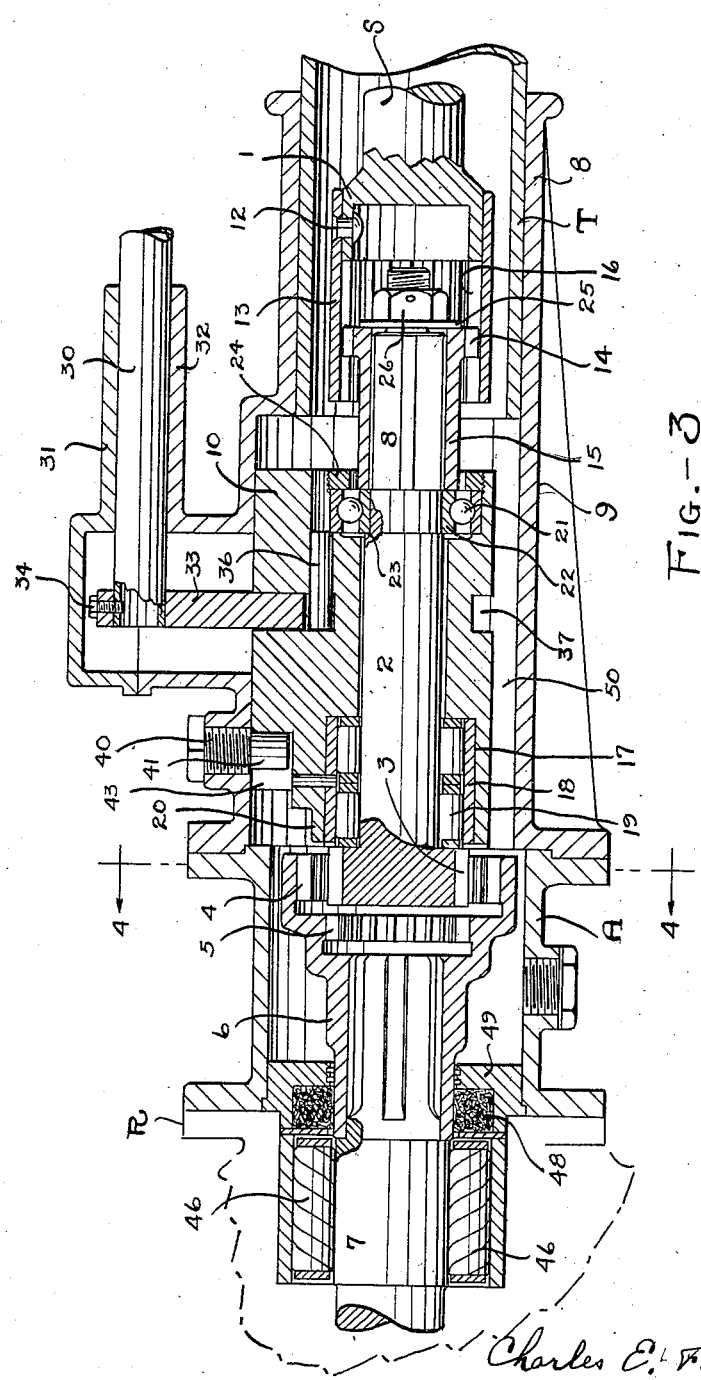

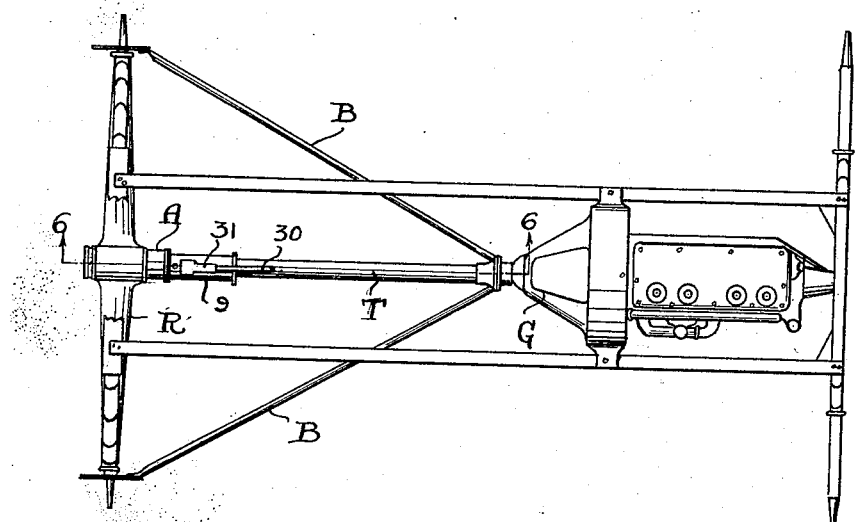
Fig.—5
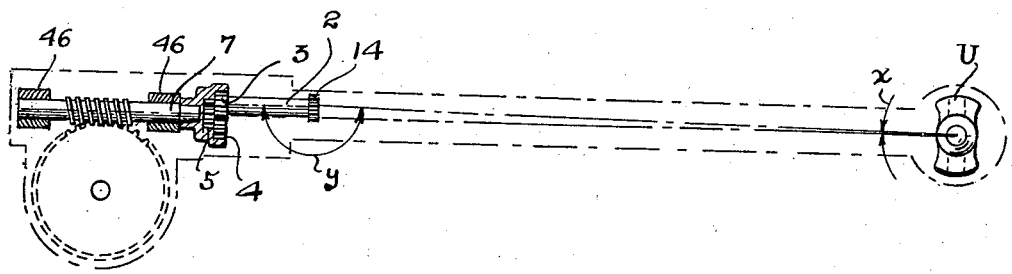
Fig.—6

Patented Oct. 29, 1929

1,733,769

UNITED STATES PATENT OFFICE

CHARLES E. F. AHLM, OF CLEVELAND, OHIO, ASSIGNOR TO AUTOMOTIVE PATENT HOLDING COMPANY, OF CLEVELAND, OHIO, A CORPORATION OF DELAWARE

TRANSMISSION GEARING

Application filed December 18, 1924. Serial No. 756,747.

This invention relates to transmission gearing, and is particularly concerned with a transmission for automobiles or trucks which are already provided with change speed gearing, for effecting an over or under speed in addition to each change of speed already afforded by such change speed gearing. It especially relates to a transmission wherein an internal gear and clutch is mounted rigid with the driven member or shaft and an external pinion on the driving member is adapted to engage either the clutch or gear on the driving member for direct or reduced speed by being shifted into or out of alignment with the axis of rotation of the driven member. Such a construction is shown, described and claimed in my prior Patent No. 1,647,981.

The primary distinguishing characteristic of this invention and an important feature is that the whole construction is exceedingly light as compared to other gearing units which have been employed for this purpose, and may be at the same time easily and cheaply manufactured and easily attached to the rear axle housing adding thereto but little weight.

The particular adaptation shown has been designed to occupy a position adjacent the rear axle of a Ford pleasure car or truck, it being understood that simple changes whereby the construction may be adapted to other cars is to be considered within the scope of my invention.

In this as well as other cars, a recognized method of bracing the rear axle housing against torsional stress is to provide a tube rigid with the rear axle housing and co-extensive with the propeller shaft, the forward end of which tube terminates in an adapter member carried by the housing for the universal joint which connects the propeller shaft to the already existing transmission gearing. My invention necessitates the removal of a short section of such tube at its rearward end and substituting in place thereof a rigid casing containing my gearing which may be rigidly secured to the tube and very easily bolted or otherwise attached to the rear axle housing or an extension projecting therefrom.

Gearing units have been mounted adjacent the rear axle housing and rigid therewith in a variety of ways, but this type of automobile construction has been abandoned by most manufacturers because of the weight thereof, so supported, being almost entirely unsprung except for the resiliency of the tires or wheels. My gearing by reason of its compact and consequently light construction does not add materially to this unsprung weight, the casing for the gearing weighing only slightly more than the section of the tube and its adapter casting which it replaces. Moreover by so placing the gearing, the necessity for removing and shortening the radius rods is obviated, while the gearing occupies hitherto practically idle space. Other objects and features will become apparent in the further description which relates to the accompanying drawings wherein I have shown a preferred form of my invention. The essential characteristics are summarized in the claims.

Figure 2:
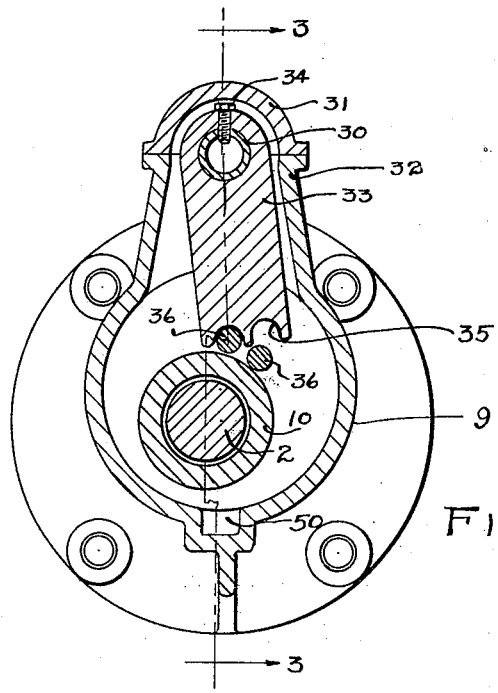
Figure 4:
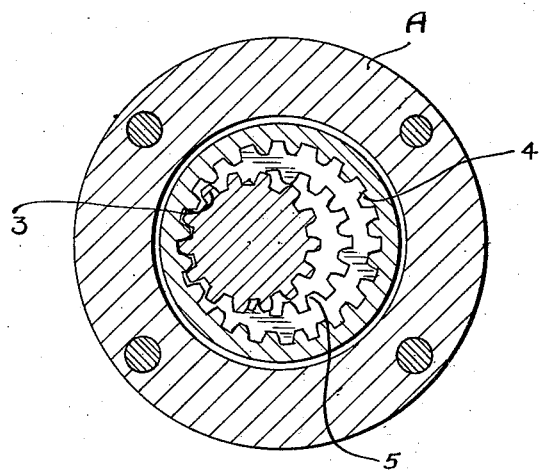

In the drawings, Fig. 1 is a plan view of my gear transmission unit; Fig. 2 is a transverse section thereof taken on the line 2—2 of Fig. 1; Fig. 3 is substantially central longitudinal section taken on the line 3—3 of Figs. 1 and 2; Fig. 4 is a transverse section indicated on the line 4—4 of Fig. 3; Fig. 5 is a plan view of an automobile chassis showing the adaptation of my invention thereto; Fig. 6 is a diagram in the nature of a cross section taken on the lines 6—6 in Fig. 5.

Briefly, the gearing consists of a driving and driven member, one of said members being mounted in rolling bearing and being rigid with a clutch and gear, the other member being mounted upon rolling bearings secured in an eccentric barrel or bearing member and having a pinion adapted to mesh with either the clutch or gear. The eccentric bearing member is mounted to rotate through a given angle within the casing to carry the pinion into driving alignment with the clutch or gear and also to be shifted longitudinally for causing the pinion to positively engage the clutch or gear for direct drive or a reduced speed. A higher speed change instead of a reduced speed may of course be accomplished by adapting the driving member of the embodiment shown, to be a driven member and thus a single additional over speed or a single additional under speed may be had in connection with each of the existing speeds of the car.

Referring again more in detail to the drawings and designating the various parts by numerals, 1 indicates the rearward end of an already existing propeller shaft S; 2, the driving member of my transmission unit which is drivingly coupled thereto, and 3 a pinion rigidly carried at the rearward end of the driving member 2. An internal gear 4 and clutch teeth 5 are carried by a tubular member 6 which is drivingly secured to the forward end of a driven shaft 7.

Referring particularly to Figs. 3, 5 and 6, it will be seen that my gearing is so positioned relative to the rear axle R and the present transmission G that installation may be easily effected by removing the rearward end of the torque tube T with its adapter casting (not shown) shortening the propeller shaft S and installing the gear unit in place of the removed and shortened parts. It will be noted that the radius rods B (Fig. 5) need not be shortened or in any way disturbed in this installation. To install the gear unit a hollow forward end 8 of the gear casing 9 is fitted over the end of the shortened torque tube and the rearward flanged end of the casing is bolted either directly to the rear axle housing or to an intermediate double flanged sleeve such as shown at A. In this manner, the rear axle housing and tube is made rigid as before, hence it is only necessary to provide for a slight universal movement to compensate for the lateral swing of the intermediate shaft 2 in being moved from direct to reduced speed position. The lesser angle of intersection of the axis of propeller shaft with that of the shaft 2 to obtain the reduction illustrated in Fig. 4 is less than one degree and therefore only a very simple universal driving coupling need be provided between these two shafts. For example in the gearing from which these drawings were made the angle which is exaggerated in Fig. 6 to illustrate the swing of the propeller shaft at the universal joint U in being moved from direct drive position to reduced speed is approximately 26′, that is the angle Y representing the larger angle of intersection of the two axes is 179° 34′.

To effect either direct or reduced speed connection between the driving member and the driven member I provide an elongated longitudinally shiftable and rotatably mounted eccentric barrel or bearing member 10 for the driving shaft 2. The length of this bearing is shown as being about one and one half times the diameter, which I have found combines compactness with the desired rigidity and admits the most desirable spacing of the roller bearings that support the shaft 2. The means for rotating and bodily moving this eccentric member will be later described. In Fig. 3, I have shown my preferred form of universal driving coupling. The rearmost end of the propeller shaft S may have an enlarged cup-like member 1 attached thereto to which a sleeve 13 is secured as by rivets 12. The interior of the sleeve 13 projects rearwardly of the propeller shaft and is splined to engage a gear-like member 14 on a sleeve 15. The sleeve may be rigidly secured to the forward end of the member 2 in any manner as by the squared portion 8 of the member 2 and complementary opening in the sleeve therefor.

I have found that the assembly of the bearing 10 and the driving shaft 2 with its various bearings may be easily accomplished when the parts are constructed as shown. The construction affords a very firm bearing for the shaft 2 which allows no overhang of the shaft from its bearing at the driving end, and in which end play likely to result in a noisy gearing is eliminated. I have shown a sleeve 18 mounted in a circular aperture 17 in the rearward end of the eccentric bearing. I provide rollers 19 between this sleeve and the shaft at the rear end thereof. It is important that such rollers be located close to the pinion whereby to prevent overhang of the shaft therefrom when the pinion is engaged only on one side, as when in mesh with the larger gear 4. In order that the rollers may be so positioned and yet allow the pinion to be carried into engagement with the clutch teeth 5, I have shown the bearing 10 as cut away at 20 so that it may lie within the zone of the gear 4 yet not touching the teeth when the pinion is in engagement with the clutch.

The other end of the shaft 2 I have shown supported by a rolling bearing 21, carried by the eccentric bearing member 10, its inner sleeve 22 bearing against a shoulder 23 on the shaft 2. A locking ring or nut 24 holds the outer bearing sleeve in place within the eccentric. To maintain the bearing sleeve 22 against the shouldered portion 23 of the shaft, through the agency of the sleeve 15, I provide a washer 25 at the other end of the sleeve, which is held against the sleeve by a locking nut 26 threaded on a still further reduced projection extending from the shaft 2.

By reason of the eccentric mounting of the member 10 within the casing, as shown in Figs. 3 and 4, the partial rotation of the member 10 effects the bodily movement of the shaft 2 to bring the pinion into alignment with the gear teeth 4 or clutch 5.

The mechanism for imparting this partial rotation to the bearing consists in this embodiment, as shown in Figs. 2 and 3, of an operating bar and gear sector member carried by the casing adjacent the eccentric bearing member. The operating bar is indicated at 30 and is slidably and rotatably supported partly by a rearward extension 32 in the upper part of the casing and partly by a cap 31 therefor. The cap covers an opening in the main casing through which the assembled shifter bar and sector may be inserted into operating position to avoid having to attach the sector to the bar in position. The opening formed by the removal of the plate also serves as a convenient opening for lubricant. A sector member 33 is rigidly secured to the inner end of the bar by a screw 34 which enters the member 30. For the sake of lightness, the member 30 is preferably a hollow tube. The lower end of the extension member 33 is notched at 35 to engage a plurality of pins 36 lying with a peripheral groove 37 formed about the bearing member 10, the groove as shown in Fig. 3 being concentric with the drive shaft 2.

To limit the throw of the eccentric member in either direction as well as to effect the accurate positioning thereof when it is moved longitudinally of the casing, I provide an inwardly projecting screw 40 shown as threaded into the top of the casing and having a reduced inwardly extending projection 41 lying adjacent a slotted portion of the eccentric. The slots as shown in Fig. 1 are of different depth. The slot 43 into which the projection 41 extends when the eccentric is positioned as in Fig. 3 is of sufficient distance to allow the engagement of the clutch teeth 5 with the pinion.

The driven member 6 may be supported in various ways depending on whether a worm drive or a bevel or spiral bevel geared connection with the rear axle is desired. A bearing suitable for a worm drive is shown as consisting of rollers 46 and similar anti-friction bearings may be used at the other end of the shaft 7 as shown in the diagram Fig. 6. Suitable packing 48 and a packing sleeve 49 are secured in the rearward end of the adapter A to prevent the escape of lubricating oil from the transmission unit into the differential casing.

To provide for lubricating the roller bearings contained in the eccentric member as well as the exterior surface thereof where it engages the casing and to provide access for oil from the rearward region of the casing wherein the gear member 6 is contained, to the universal driving coupling, I have provided a slot 50 formed in the bottom of the casing, as shown in Figs. 2 and 3.

It will be seen that I have provided an extremely light and durable reduction gearing which will operate efficiently in connection with the rear axle of a car, which is extremely easy to install and which will not materially increase the unsprung weight of the vehicle. Various changes in the details of construction may be made within the scope and spirit of my invention and I do not wish to be precluded from the right to any mere mechanical equivalent of the gearing herein shown.

I claim—

1. In a gearing of the class described in combination, a driving member and a driven member one being bodily movable transversely and longitudinally of its axis, an internal gear on one of said members, an external gear on the other of said members, a dental clutch rigid with the internal gear, a casing, means including an eccentrically mounted member mounted for partial rotation in the casing for supporting the bodily movable member, gear members carried by the eccentrically mounted member, a longitudinally shiftable and rotatable bar carrying a sector member in engagement with the gear members for longitudinally shifting the eccentrically mounted member and bodily moving said member to selectively engage the external gear with the internal gear or clutch, a cover member attached to the casing along a plane coincident with the axis of rotation of the bar whereby the bar and sector may be assembled into the gearing as a unit.

2. In combination with a member adapted to drive a gear on the rear axle of an automobile, an internal gear and a clutch carried thereby, a driving member having a pinion adapted to engage with the gear or clutch, an elongated bearing for the driving member, an eccentric mounting in the casing therefor, rolling bearings in either end of said elongated member, a dental member carried by the driving member, a universal driving coupling adapted to connect the dental member with the propeller shaft of an automobile, a peripheral groove in the eccentric member substantially centrally thereof and concentric with the axis of rotation of the driving member, gear members comprising rods extending into said groove and a sector member extending into said groove and cooperating with the rods for rotating said eccentric member to align the pinion with the gear or clutch, and a longitudinally movable and rotatable bar carried by the casing for supporting the sector member.

In testimony whereof, I hereunto affix my signature.

CHARLES E. F. AHLM.